United States Patent
Kim et al.

[11] Patent Number: 5,822,424
[45] Date of Patent: Oct. 13, 1998

[54] DIAL PULSE DETECTOR AND DETECTING METHOD FOR PAGING SERVICE FOR MECHANICAL TELEPHONE SUBSCRIBER

[75] Inventors: Young-Keun Kim; Young-Ky Kim; Jae-Min Ahn; Nam-Sun Kim; Soon-Young Yoon, all of Seoul, Rep. of Korea

[73] Assignee: SamSung Electronics Co., Ltd., Kyungki-do, Rep. of Korea

[21] Appl. No.: 747,564

[22] Filed: Nov. 12, 1996

[30] Foreign Application Priority Data

Nov. 10, 1995 [KR] Rep. of Korea .................. 1995 40637

[51] Int. Cl.$^6$ ..................................... H04M 3/00
[52] U.S. Cl. .......................... 379/377; 379/286; 379/342
[58] Field of Search ..................... 379/377, 386, 379/170, 217, 286, 287, 372, 342, 365, 379; 375/376, 354, 371, 340, 343

[56] References Cited

U.S. PATENT DOCUMENTS

| | | | |
|---|---|---|---|
| 3,935,392 | 1/1976 | Smith et al. | 379/386 |
| 4,219,890 | 8/1980 | Sugihara | 375/345 |
| 4,590,432 | 5/1986 | Di Borgoricco | 379/286 |
| 4,732,355 | 3/1988 | Parker | 246/34 R |
| 4,839,920 | 6/1989 | Held-Elbert et al. | 379/286 |
| 4,857,858 | 8/1989 | Tahara | 375/349 |
| 4,893,329 | 1/1990 | O'Brien | 379/373 |
| 4,924,501 | 5/1990 | Cheeseman et al. | 379/286 |
| 4,944,001 | 7/1990 | Kizuik et al. | 379/286 |
| 5,218,636 | 6/1993 | Hamilton | 379/386 |
| 5,355,141 | 10/1994 | Graham et al. | 342/444 |

*Primary Examiner*—Ahmad F. Matar
*Assistant Examiner*—Jacques M. Saint-Surin
*Attorney, Agent, or Firm*—Robert E. Bushnell, Esq.

[57] ABSTRACT

A dial pulse detector in a paging system for rendering a paging service for a subscriber who uses a mechanical telephone includes a delay correlativity calculator for receiving dial pulses generated by predetermined pre-test dialing digits dialed by the subscriber, calculating the correlativity between the delayed dial pulse and undelayed dial pulse to sample a reference signal of the dial pulse. An energy correlativity calculator calculates the energy correlativity between the sampled reference signal and the successively received dial pulse to examine the validity of the reference signal. A dial pulse verifier operates according to recognition of the validity of the reference signal by the energy correlativity calculator and checks input number of times and input time of the dial pulse so as to verify whether the dial pulse corresponds to the pre-test dialing digits.

30 Claims, 5 Drawing Sheets

DIAL PULSE DETECTOR AND DETECTING METHOD FOR PAGING SERVICE FOR MECHANICAL TELEPHONE SUBSCRIBER

This application makes claims all benefits accruing under 35 U.S.C. §119 from an application for DIAL PULSE DETECTOR AND DETECTING METHOD FOR PAGING SERVICE FOR MECHANICAL TELEPHONE SUBSCRIBER earlier filed in the Korean Industrial Property Office on the 10th day of Nov. 1995 and there duly assigned Ser. No. 40637/1995.

BACKGROUND OF THE INVENTION

1. Field of the Invention

The present invention relates to a system for rendering a paging service, and more particularly to a dial pulse detector in a system for rendering a paging service for a subscriber who uses a mechanical telephone.

2. Description of the Related Art

In a paging system with subscribers, detecting a dial pulse can be necessary. To easily detect a dial pulse, the subscriber dials test dialing digits. The test dialing digit allows sampling of characteristics of transmissions. While observing the dial pulses generated by test dialing digits dialed by the subscriber, a dial pulse detector searches for values and stores detection times of the values. If the times and values meet a predetermined condition, the magnitude of the dial pulse is stored. A series of values are detected and the number of those values is counted to check whether the counted number is the same as a preset number.

We have noticed that in a less than ideal reality, this technology faces problems. As the technology may use comparisons of signal magnitudes for detecting and differentiating among dial pulses, less than ideal situations for signals poses problems. For example, background noise, distance, and mechanical wear can adversely affect signals. This is especially true for a mechanical telephone. In contrast to an electronic telephone, a mechanical telephone can eventually wear out after a number of uses. In addition to these factors, one must account for a wide range of errors that can occur with multiple subscribers. We have found that the art has a need for an effective dial pulse detector in a paging system for providing a degree of improvement in the paging service.

It has been our observation that Exemplars of contemporary practice do not appear to satisfy that need for such a dial pulse detector. Graham et al (U.S. Pat. No. 5,355,141, *Channelized Bearing Processor*, Oct. 11, 1994) discloses a channelized bearing processor, which determines the direction and characteristics of an unknown signal source. A received microwave signal having a certain frequency range is mixed with a microwave local oscillator signal applied to an input to produce an output signal. The output signal is delayed for predetermined times in delay devices. Tahara (U.S. Pat. No. 4,857,858, *Digital Demodulation System Having Independently Operating Cross-polarization Cancellers*, Aug. 15, 1989) endeavors to provide a digital demodulation systems for demodulating intermediate frequency versions of radio frequency signals. A main digital demodulator provides demodulation on combined IF signals to generate a main (N+1)-bit output and derives an N-bit data signal and an error component. An auxiliary digital demodulator derives a data component. The derived error and data components are supplied to a correlator to generate a control signal. Parker (U.S. Pat. No. 4,732,355, *Rate Coding Decoding System*, Mar. 22, 1988) attempts to provide a system that prevents loss of rate code signals during phase shifts (also known as phase jumps). A correlation process is applied to the received rate code signal by multiplying the signal in separate multipliers with reference signals which are in quadrature and then cross-correlating the output of the multipliers with a step function and summing the absolute values of the outputs of the cross-correlators to provide a level which is substantially constant in the presence of a phase jump. The cross-correlation system provides a filter. Sugihara (U.S. Pat. No. 4,219,890, *Digital Signal Regulation System*, Aug. 26, 1980) discloses a system for regulating a digital signal which is modulated such that an average of their amplitude over a given interval varies from interval to interval. The digital signal comprises a train of pulses formed by pulse tops and pulse bottoms both of which are equally spaced from a reference level. Based on our study of the exemplars of the art, we believe that the art has a need for an effective dial pulse detector in a paging system for rendering a paging service for a subscriber that uses correlativity calculations as in the present invention.

SUMMARY OF THE INVENTION

An object of the present invention is to provide an improved system for rendering a paging service.

It is another object to provide an improved dial pulse detector in a system for rendering a paging service for a subscriber who uses a mechanical telephone.

It is still another object to provide an improved dial pulse detector for detecting a dial pulse to verify paged digits.

It is yet another object to provide an improved dial pulse detecting method that verifies paged digits.

It is still yet another object to provide a dial pulse detector and process exhibiting a high degree of a high reliability in detecting a dial pulse, so as to render a quality paging service to a mechanical telephone subscriber.

It is a further object to provide a dial pulse detecting circuit and process with a high reliability in detecting a dial pulse, so as to render a qualified paging service to a mechanical telephone subscriber.

It is a still further object to provide an optimum dial pulse detector giving a high degree of performance during transmission of voice signals in the presence of ground noise.

It is yet further object to provide an optimum dial pulse detecting method having a high performance in dealing with a voice signal and a ground noise.

It is also an object to provide a dial pulse detection method which samples a reference signal for a dial pulse from a test dialing digit by using a delay correlator, and implements a stable dial pulse detector by adopting an energy correlator and dial pulse verifier with respect to a subsequent dial pulse.

To achieve one or more of the above objects, there is provided a dial pulse detector including a delay correlativity calculator receiving dial pulses generated by predetermined pre-test dialing digits dialed by a subscriber, calculating a correlativity between a delayed dial pulse and an undelayed dial pulse to sample a reference signal of the dial pulse. An energy correlativity calculator calculates an energy correlativity between the sampled reference signal and a received dial pulse, and examines validity of the reference signal. A dial pulse verifier operates according to a recognition of the validity of the reference signal by the energy correlativity calculator, checks input number of times and input time of the dial pulse, and verifies whether the dial pulse corresponds to the pre-test dialing digits.

To achieve one or more of the above objects, there is provided a dial pulse detecting method including a delay correlativity calculating step of calculating a correlativity between a dial pulse generated by predetermined pre-test dialing digits dialed by a subscriber and a dial pulse delayed by a predetermined period, and of sampling a reference signal of the dial pulse. The method also includes an energy correlativity calculating step of calculating the energy correlativity between the sampled reference signal and a received dial pulse to examine validity of the reference signal. In addition, there is a dial pulse verifying step of being operated according to a recognition of the validity of the reference signal in the energy correlativity calculating step and checking input number of times and input time of the dial pulse and verifying whether the dial pulse corresponds to the pre-test dialing digits.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
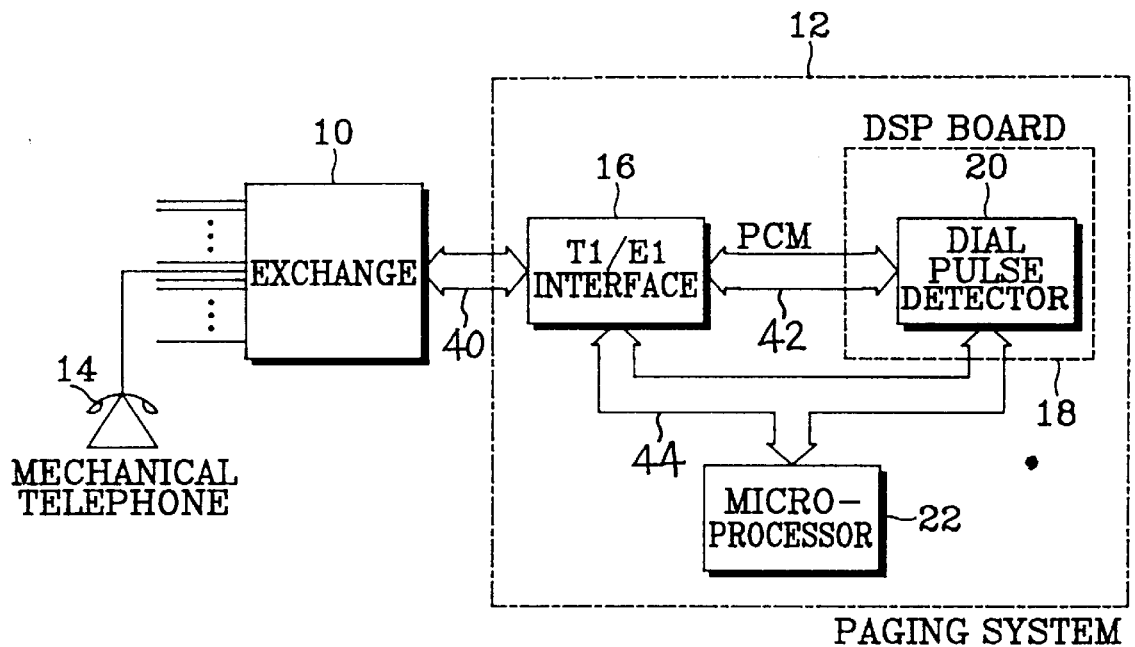
FIG. 1 is a schematic diagram representing the salient features of a hypothetical aging system for rendering a paging service for a subscriber using a mechanical telephone, according to a contemporary practice.

Turning now to the drawings, a system for rendering a paging service for a subscriber who uses a mechanical telephone is shown in FIG. 1. In FIG. 1, a mechanical telephone 14 is connected to an exchange 10. The exchange 10 is connected to a paging system 12 by means of communication lines 40.

The paging service for a subscriber is performed according to the following procedures. If the mechanical telephone 14 used by the subscriber is connected to the exchange 10, the subscriber begins by dialing test dialing digits. At this beginning, the procedure uses the zero (0) digit. A dial pulse generated by the dialing operation of the telephone 14 is sent to a T1/E1 interface 16 of the paging system 12 via the exchange 10. At this instant, this generated dial pulse is an analog signal having a series of cycles. The dial pulse is converted into a digital signal (PCM signal). The dial pulse passes through the T1/E1 interface 16 of the paging system 12. Then, the dial pulse is transmitted to a dial pulse detector 20 in a digital signal processor (DSP) board 18. Afterwards, the dial pulse detector 20 detects an input dial signal. During these operations, control operations occurring in the paging system 12 is handled by a microprocessor 22. Communication occurs through communication lines 42 and 44.

In a system for rendering a paging service for the subscriber using the mechanical telephone, dial pulses must be detected. As a method for detecting a dial pulse easily, the subscriber dials test dialing digits. The test dialing digit is usually zero. Such test dialing is for sampling. The test dialing digit allows easier sampling of characteristics of time intervals of dial pulses transmitted from the current subscriber and allows easier sampling of characteristics of signal magnitudes. If these characteristics are sampled, the later transmitted dial pulses can be easily detected by using the sampled values. This enhances the reliability of detection of the dial pulses.

A general method of detecting a dial pulse by using the dial pulse detector 20 will now be described. While observing the dial pulses generated by test dialing digits dialed by the subscriber, the dial pulse detector 20 searches a first maximum value, stores the detection time thereof and waits is a next (second) maximum value. After the second maximum value is generated and detected, the detection time thereof and that of the first maximum value are compared to check whether the time interval is valid. Usually, the time interval is 60 milliseconds, and a trivial error (an error within an acceptable margin or an error in ignorable matters) is ignored. If the generation interval satisfies this condition, the magnitude of the dial pulse is stored. While waiting a third maximum value coming after the second one, the generation interval and magnitude of the signal are checked. At this time, the time interval is about 33 milliseconds. Two dial pulses generated in time intervals of 66 milliseconds and 33 milliseconds form a cycle. Thus, dial pulses are generated twice as many as that of arbitrary dialing digits. In this way, a series of maximum values are detected and the number thereof is counted to check whether the counted number is the same as a preset number. At this portion of the procedure, if nine (9) is used as the preset number, 18 dial pulses are generated. If zero (0) is used as the preset number, the number of the generated dial pulses is 20.

However, the above-described dial pulse detecting technology involves several problems. First, since the technology is very sensitive to voice signals and background noise, the technology can be used only under ideal conditions. This is necessary as the signal magnitude are used for differentiating a dial pulse. Second, a subscriber who is far from the exchange cannot have a qualified paging service; a subscriber must be near the exchange. This is because the signal magnitude of a dial pulse is greatly reduced if the distance between the subscriber and exchange is increased. Third, in contrast with an electronic telephone, because the mechanical telephone wears out upon a number of cycles, the characteristics of a dial pulse signal may greatly vary. Finally, in order to render a service to many subscribers, an error of a wide range should be presumed. These factors decreases the reliability of sampling of characteristic values of the dial pulses sampled from the test dialing digits. If the characteristic values are used, the detection of dial pulse has a low reliability.

Hereinbelow, a preferred embodiment of the present invention will now be described in detail with reference to accompanying drawings. It should be noted that the same reference numerals are designated for the same elements throughout the drawings, even though shown in different drawings. The paging system according to the present invention for a paging service for a mechanical telephone subscriber may be the same as that shown in FIG. 1. However, the structure and operation of the dial pulse detector for implementing the object of the present invention are quite different from others of the contemporary practice.

Figure 2:
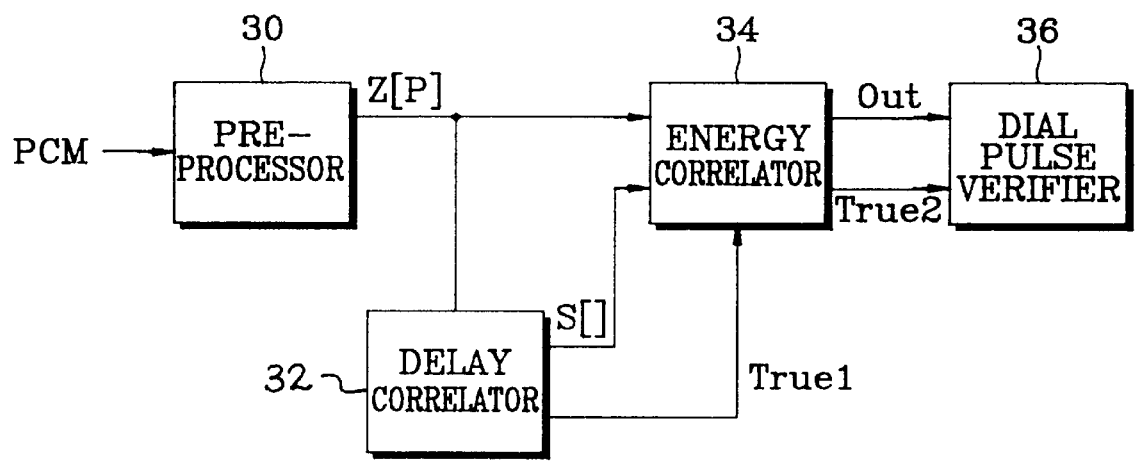
FIG. 2 is a block diagram of a dial pulse detector built according to the principles of the present invention.
Figure 3:
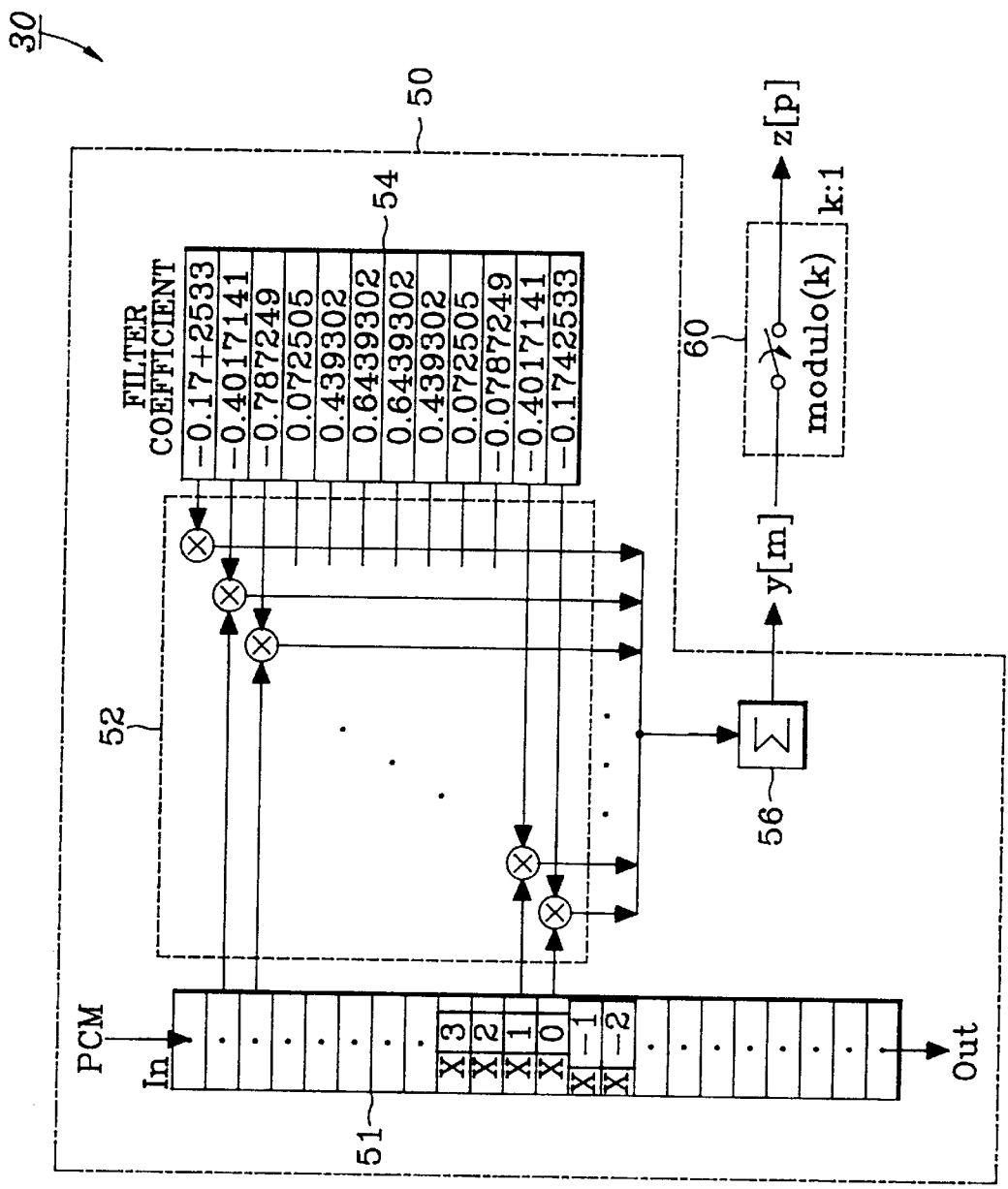
FIG. 3 is a detailed block diagram of a pre-processor in FIG. 2.

In the present invention, all processes for handling the PCM signal transmitted from the paging system 12 to the dial pulse detector 20 are controlled by an internal program of an RISC processor, e.g., TMS320C31. FIG. 2 is a block diagram of the dial pulse detector 20 according to the present invention, which includes a pre-processor 30, a delay correlator 32, an energy correlator 34 and a dial pulse verifier 36. The pre-processor 30 filters the dial pulses generated by predetermined pre-test dialing digits dialed by a mechanical telephone subscriber with a dial pulse band and samples only the dial pulse for each predetermined cycle among the filtered dial pulses. As shown in FIG. 3, this involves a filter 50 for filtering the band of a dial pulse signal, and a sampler 60 for sampling only each kth dial pulse among the filtered dial pulses. The delay correlator 32 calculates the correlativity between the dial pulse that is output from the pre-processor 30 and another dial pulse obtained by delaying the dial pulse by a predetermined cycle. Thus, a reference signal of the dial pulse is sampled. The energy correlator 34 calculates the energy correlativity between the reference signal sampled from the delay correlator 32 and the dial pulse applied successively from the pre-processor 30, thereby examining the validity of the reference signal. The dial pulse verifier 36 operates according to recognition of the validity of the delayed signal by the energy correlator 34, and checks input number of times and input time of the dial pulse so as to verify whether the dial pulse is valid as the pre-test dial.

Figure 6:
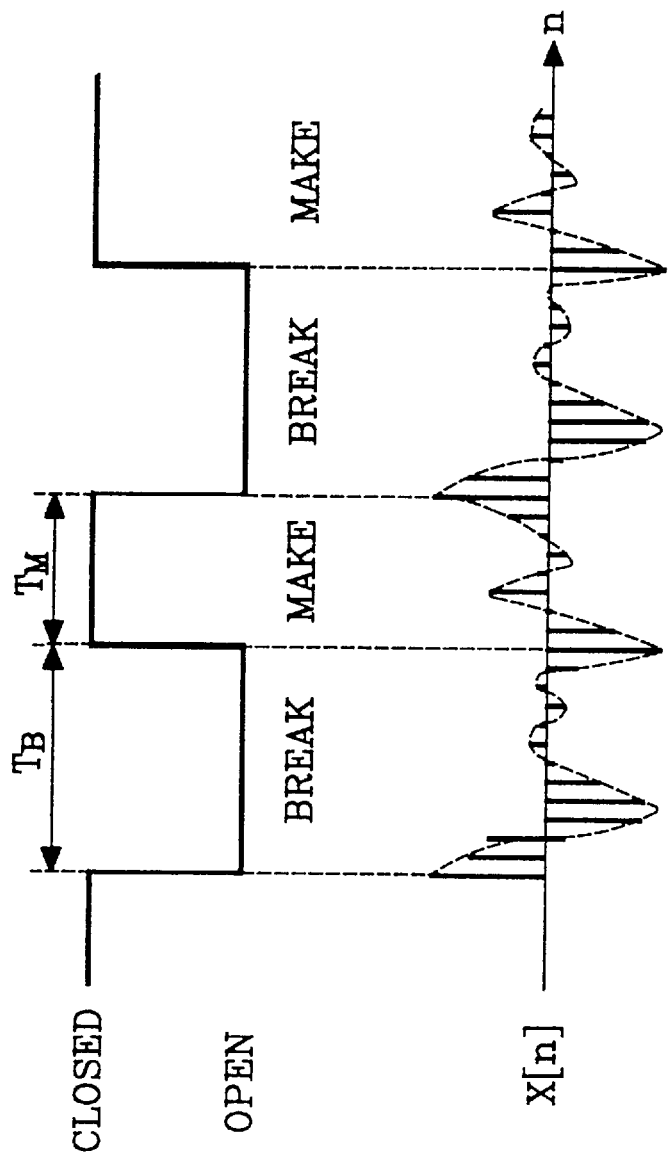
FIG. 6 is a waveform diagram of a dial pulse.

FIG. 6 shows a waveform of a dial pulse. In FIG. 6, a dotted line represents an analog signal received in the paging system (12 in FIG. 1), and the discrete values therein represent signals output from the sampler 60 in FIG. 3 to be described later. The waveform of the upper portion of FIG. 6 explains that dial pulses are in time intervals of 66 milliseconds ($T_B$) and 33 milliseconds ($T_M$).

A pre-processor 30 can be used to filter signals before sending to a delay correlator 32 or sending to an energy correlator 34. FIG. 3 is a detailed block diagram of the pre-processor 30 in FIG. 2, which includes a filter 50 for filtering the band of a dial pulse signal, and a sampler 60 for sampling only each kth dial pulse among the filtered dial pulses. The dial pulses applied to the dial pulse detector 20 are pre-processed through the filter 50 and sampler 60 shown in FIG. 3. The filter 50 is a finite impulse response filter and removes noise contained in the dial pulses. The exemplars of filter coefficients shown in FIG. 1, the filter coefficients 54, are for a low-pass filter having a stop band of 0.9 kilohertz. The dial pulses applied to the filter 50 are stored in a first-in-first-output (FIFO) type buffer 51. While being stored in the buffer 51, the dial pulses are weighted-summed with the filter coefficients 54 by weight summators 52 and 56. The output values y[m] output from the filter 50 become the low-pass-filtered dial pulses. The output values y[m] pass through the sampler 60 and only the kth digital values are passed. The signals output from the sampler 60 are represented by Z[p]. If the dial signals are pre-processed in the pre-processor 30 in the above manner, the pre-processed dial signals are applied to the delay correlator 32 so that the reference signals s[] of the dial pulses are sampled.

Figure 4:
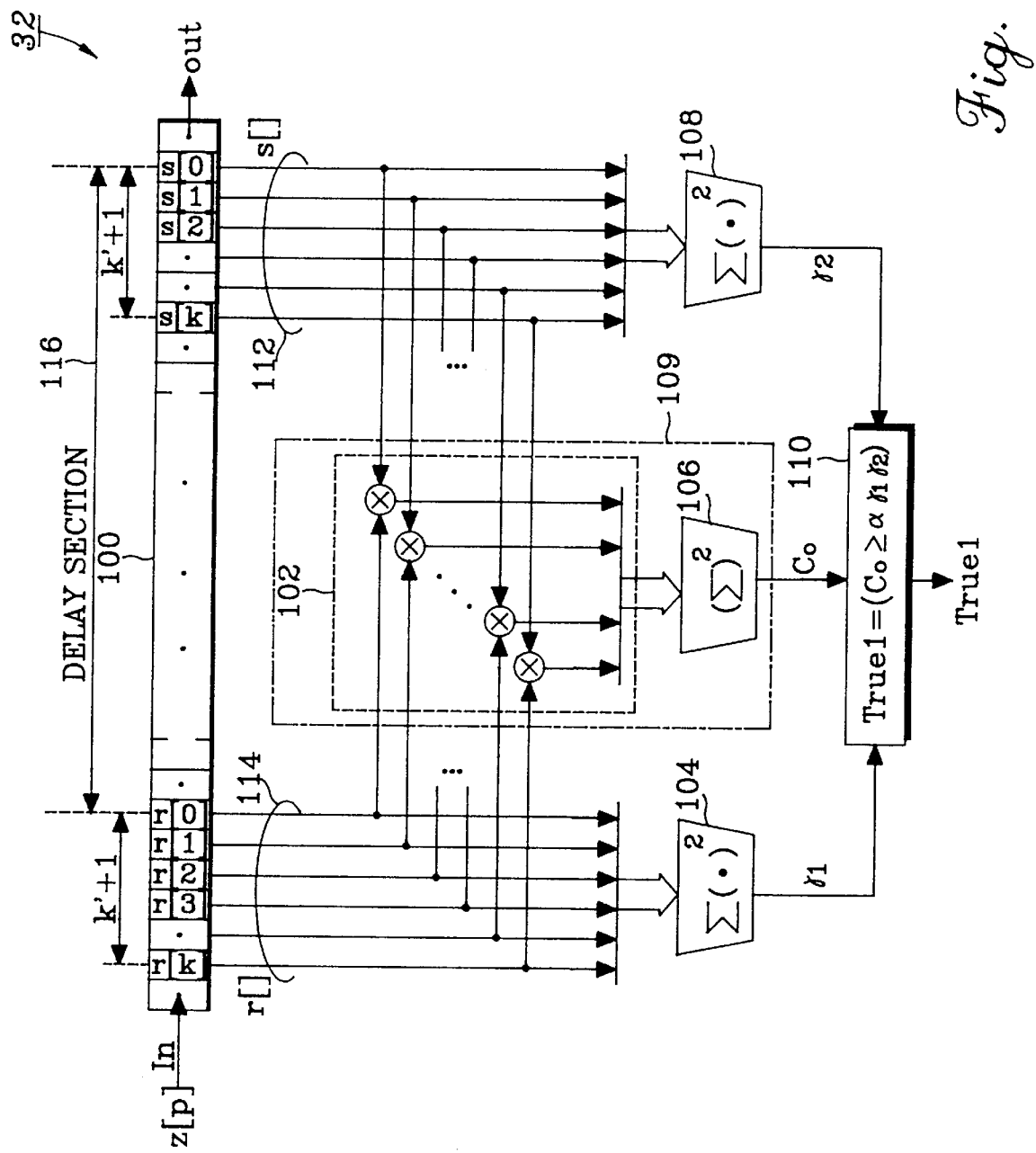
FIG. 4 is a detailed block diagram of a delay correlator in FIG. 2.

FIG. 4 shows a detailed block diagram of the delay correlator 32 in FIG. 2. The dial pulses Z[p] pre-processed in the pre-processor 30 are applied to the delay correlator 32 shown in FIG. 4. First, the dial pulses Z[p] are passed through a FIFO type buffer 100 in the delay correlator 32. An average time interval required for transmitting one sample among the dial pulses Z[p] from the buffer 100 is k/8 milliseconds. When samples are transmitted in such a manner, the samples s[] 112 having a width of k'+1 become an input source of a second calculator 108. Two samples s[] and r[] are input sources of a third calculator 109. A first calculator 104 receives the samples r[] and performs calculation in the following equation (1) to output a result value $\gamma 1$.

$$\gamma_1 = \sum_{k=0}^{k'} r(k)^2 \quad (1)$$

The second calculator 108 receives the samples s[] and performs calculation in the following equation (2) to output a result value $\gamma 2$.

$$\gamma_2 = \sum_{k=0}^{k'} s(k)^2 \quad (2)$$

The first and second calculators 104 and 108 sum squared sample values to obtain the result values $\gamma 1$ and $\gamma 2$, which represent the energies of the respective signal. The third calculator 109 is composed of a multiplier 102 for multiplying the respective samples r[] and s[] and a calculator 106 for squaring and summing the outputs of the multiplier 102. The third calculator 109 receives the samples r[] and s[] and performs calculation in the following equation (3) to output a result value $C_0$.

$$C_0 = \left| \sum_{k=0}^{k'} r(k)s(k) \right|^2 \quad (3)$$

The result values $\gamma 1$, $\gamma 2$ and $C_0$ output from the first, second and third calculators 104, 108 and 109 are applied to a delay correlativity determiner 110. The delay correlativity determiner 110 outputs a True1 signal if the result values $\gamma 1$, $\gamma 2$ and $C_0$ satisfy the following relationship (4).

$$C_o \geq \alpha \gamma 1 \gamma 2 \quad (4)$$

$$\therefore \alpha \leq \frac{C_0}{\gamma 1 \gamma 2}$$

$\alpha$, which is a scale factor, is typically set to about 0.7.

$$\frac{C_0}{\gamma 1 \gamma 2}$$

approaches one in value if the shapes of two signals s[] and r[] are similar to each other.

$$\frac{C_0}{\gamma 1 \gamma 2}$$

approaches if the shapes of two signals s[] and r[] are very different from each other.

Therefore, the delay correlativity determiner 110 outputs the True1 signal if the two signals s[] and r[] are almost the same in their shapes. In order for the delay correlator 32 to examine the cycles of the dial pulses having various values, the values of the delay section 116 have only to be adjusted. Such an operation of the delay correlator 32 searches very successfully so as to determine whether a delayed signal and an undelayed signal are the same in their shape. If the output of the delay correlator 32 is True1, the signals s[] 112 are used as the reference signals of the dial pulses. The characteristics of the reference signals are such that the reference signals are representative of two pure dial pulses (one cycle). Thus, if the reference signals s[] represent two pure dial pulses, the successively coming dial pulses will have almost the same shape as that of the reference signals. The reference signals s[] are supplied to the energy correlator 34.

Figure 5:
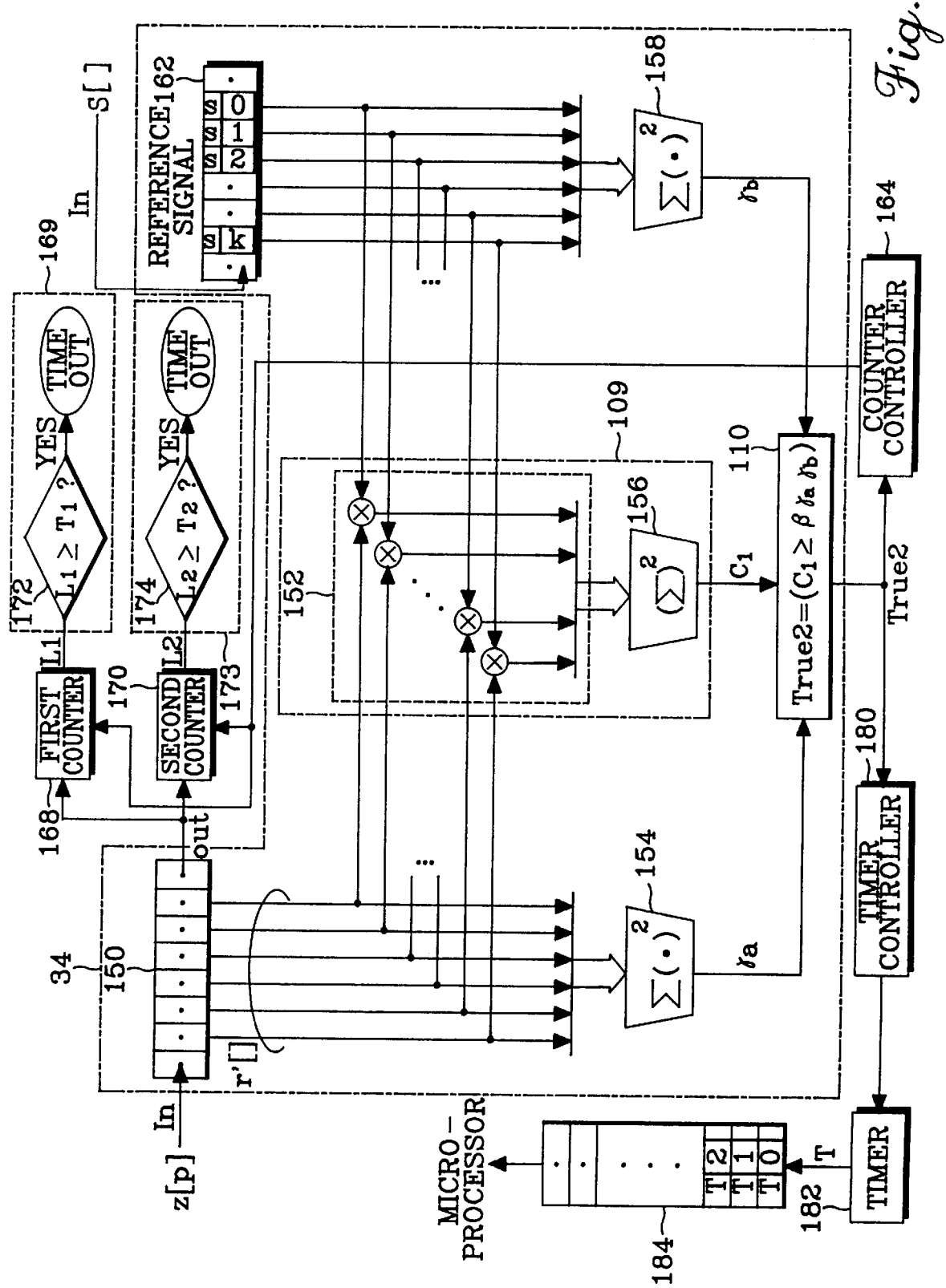
FIG. 5 is a detailed block diagram of an energy correlator and a dial pulse verifier in FIG. 2.

The energy correlator 34 receives the sampled reference signals s[] from the delay correlator 32 and then receives the dial pulses Z[p] successively output from the pre-processor 30. Then, the energy correlativity between the dial pulses Z[p] and reference signals s[] is calculated to examine the validity of the reference signals as being the dial pulses. The energy correlator 34 is shown in FIG. 5. The energy correlator 34 of FIG. 5 has a similar structure as that of the delay correlator 32 of FIG. 4. The energy correlator 34 is constituted by a first buffer 150, a second buffer 162, a first calculator 154, a second calculator 158, a third calculator 159 and an energy correlativity determiner 160.

The first buffer 150 temporarily stores the dial pulses Z[p], and outputs to the first calculator 154. Therefore, the first calculator 154 receives the samples r'[] supplied from the buffer 150 and performs calculation in the following equation (5) to output a result value $\gamma_a$.

$$\gamma_a = \sum_{k=0}^{k'} r'(k)^2 \quad (5)$$

The second buffer 162 stores samples of the reference signals s[] supplied from the delay correlator 32 and outputs the same to the second calculator 158. Therefore, the second calculator 158 receives the samples of the reference signals s[] output from the buffer 162 and performs calculations in the following equation (6) to output a result value $\gamma_b$.

$$\gamma_b = \sum_{k=0}^{k'} s(k)^2 \quad (6)$$

The third calculator 109 is constituted by a multiplier 152 for multiplying the respective samples r[] and s[] and a calculator 156 for squaring and summing the outputs of the multiplier 152. The third calculator 109 performs calculation in the following equation (7) to output a result value $C_1$.

$$C_1 = \left| \sum_{k=0}^{k'} r'(k) s(k) \right|^2 \quad (7)$$

The resulting values $\gamma_a$, $\gamma_b$ and $C_1$ output from the first, second and third calculators 154, 158 and 159 are applied to a energy correlativity determiner 160.

The energy correlativity determiner 160 outputs a True2 signal if the result values $\gamma_a$, $\gamma_b$ and $C_1$ satisfy the following relationship (8). If the relationship (8) is not satisfied, the True2 signal is not output.

$$C_1 \geq \beta \gamma_a \gamma_b \quad (8)$$
$$\therefore \beta \leq \frac{C_1}{\gamma_a \gamma_b}$$

$\beta$, which is a scale factor, is typically about 0.7.

$$\frac{C_1}{\gamma_a \gamma_b}$$

approaches 1 if the shapes two signals s[] and r[] are similar to each other.

$$\frac{C_1}{\gamma_a \gamma_b}$$

approaches to 0 if the two signals are very different from each other. Therefore, the energy correlativity determiner 160 outputs the True2 signal if the two signals s[] and r[] are almost the same in their shapes. Outputting the True2 signal from the energy correlator 34 means that the shape of the current dial signals r'[] is similar to that of the reference signals s[]. The True2 signal output from the energy correlator 34 is applied to a dial pulse verifier (36 of FIG. 2).

The dial pulse verifier 36 is a block excluding the energy correlator 34 in FIG. 5. The dial pulse verifier 36 verifies whether the reference signals s[] are valid dial pulses. Such verification is based on (1) number of times that signals have been input and (2) time of input of the True2 signal that was output from the energy correlator 34. The number of times that signals have been input and input time of the True2 signal are related to test dials. In one embodiment, having the test dial of zero (0), it is verified that the input number of times and input time of the True2 signal are appropriate. The delay correlator 32 shown in FIG. 4 is also applied to the test dial. At this time, the detected reference signal s[] is a front portion of signals of the test dial. The energy correlator 34 and dial pulse verifier 36 examines the rear portion of signals of the test dial, comparing with the detected reference signal. Then, a detection of the test dial is performed. As the result thereof, it is understood that if the detected digit is zero, the reference signal is a valid dial pulse.

Referring to FIG. 5, the operation of the dial pulse verifier 36 will be described. First and second counters 168 and 170 count up by one whenever a sample is output from the first buffer 150 of the energy correlator 34. A counter controller 164 applies a clear flag to the first and second counters 168 and 170 whenever a True2 signal is output from the energy correlator 34. The first and second counters 168 and 170 are cleared whenever the clear flag is applied thereto. From that time, the first and second counters 168 and 170 begin anew in performing a count-up. At this time, assuming that a counted value output from the first counter 168 is L1 and a counted value output from the second counter 170 is L2, the counted value L1 is applied to a first time-out unit 169 and the counted value L2 is applied to a second time-out unit 173. The first time-out unit 169 detects the time duration for which the reference signal is not detected, and the second time-out unit 173 notifies a point of time when successive dial pulses are disconnected. The first time-out unit 169 includes a first comparator 172 and generates a first time-out if the counted value L1 of the first counter 168 exceeds a critical value T1 of the time duration. The second time-out unit 173 includes a second comparator 174 and generates a second time-out if the counted value L2 exceeds a critical value T2 of the discontinuation time of the successive dial pulses. The generation of the first time-out and second time-out means that the dial pulses do not correspond to the test dials. The first time-out and second time-out are output to a controller 22 of the DSP board (18 of FIG. 1). The controller 22 of the DSP board checks the first time-out and second time-out and declares that the dial pulses are not the test dial.

A timer controller 180 controls a timer 182 whenever the True2 signal output from the energy correlator 34 is generated. Under the control of the time controller 180, the timer 182 records data concerning the time when the dial pulses are detected in a detection time storage buffer 184. The data recorded in the detection time storage buffer 184 is read by the controller 22 of the DSP board 18. The controller 22 of the DSP board checks among the data recorded in the data recorded in the detection time storage buffer 184, so as to find a specific range of times for use in comparisons. Using this data, the controller 22 the controller 22 determines whether the time of the two successively detected dial pulses is in the specific range. If the time is not in the specific range, a detection error is declared.

As described above, in the present invention, based on the signal pre-processing, the delay correlativity calculation, the energy correlativity calculation and the dial pulse verification, the previous test dial is checked. This permits sampling characteristic values of the dial pulses that are transmitted from the mechanical telephone subscriber. If the subsequent paged digits are examined with the characteristic values of the sampled dial pulses, the digits can be exactly detected. As described above, the dial pulse detector according to the present invention is adaptable to different kinds and distances encountered by the telephone used by the subscriber and is not easily affected by the voice and background noise. Also, the dial pulse detector can accommodate wide variations in the characteristic values of the dial signal. Therefore, the dial pulse detector can offer a quality paging service to a subscriber using a mechanical telephone.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A dial pulse detector in a paging system for rendering a paging service for a subscriber using a mechanical telephone, comprising:

a pre-processor filtering dial pulses generated by predetermined pre-test dialing digits dialed by a mechanical telephone subscriber with a dial pulse band and samples only the dial pulse for each predetermined cycle among said filtered dial pulses, said pre-processor comprising
      a low-pass, finite impulse response filter filtering a band of a dial pulse signal, said low-pass filter removing noise contained in the dial pulses, and
      a sample sampling only each kth dial pulse among said filtered dial pulses;

a delay correlativity calculator receiving dial pulses generated by predetermined pre-test dialing digits dialed by said subscriber, calculating the correlativity between a delayed dial pulse and an undelayed dial pulse to sample a reference signal of said dial pulse, delay correlativity calculator comprising
      a dial pulse delayer delaying applied dial pulses at a predetermined velocity, said dial pulse delayer having a first-in-first-out type buffer;
      a first calculator receiving a first predetermined number of samples r[] among said dial pulses which are not delayed, and performing calculation in the following equation (1) to output a result value γ1;
      a second calculator receiving a second predetermined number of samples s[] among said dial pulses which are delayed by a first predetermined delay period, and performing calculation in the following equation (2) to output a result value γ2;
      a third calculator receiving said samples r[] and s[] and performing calculation in the following equation (3) to output a result value $C_0$; and
      a delay correlativity determiner receiving said result values γ1, γ2 and $C_0$ and determining the delay correlativity of said dial pulse using the following relationship set forth in equation (4):

$$\gamma_1 = \sum_{k=0}^{k'} r(k)^2 \tag{1}$$

$$\gamma_2 = \sum_{k=0}^{k'} s(k)^2 \tag{2}$$

$$C_0 = \left| \sum_{k=0}^{k'} r(k)s(k) \right|^2 \tag{3}$$

$$C_o \geq \alpha\gamma_1\gamma_2; \tag{4}$$

an energy correlativity calculator calculating an energy correlativity between said sampled reference signal and a received dial pulse to examine validity of said reference signal, said energy correlativity calculator comprising:
      a first buffer temporarily storing a third predetermined number of samples r'[] among successively applied dial pulses;
      a second buffer temporarily storing a fourth predetermined number of said samples s[] among said sampled reference signals;
      a first calculator receiving said samples r'[], and performing calculation in the following equation (5) to output a result value $\gamma_a$;
      a second calculator receiving said samples s[], and performing calculation in the following equation (6) to output a result value $\gamma_b$;
      a third calculator receiving said samples r[] and s[], and performing calculation in the following equation (7) to output a result value $C_1$; and
   an energy correlativity determiner receiving said result values $\gamma_a$, $\gamma_b$ and $C_1$; and determining the energy correlativity using the following relationship (8):

$$\gamma_a = \sum_{k=0}^{k'} r'(k)^2 \tag{5}$$

$$\gamma_b = \sum_{k=0}^{k'} s(k)^2 \tag{6}$$

$$C_1 = \left| \sum_{k=0}^{k'} r'(k)s(k) \right|^2 \tag{7}$$

$$C_1 \geq \beta\gamma_a\gamma_b; \text{ and} \tag{8}$$

a dial pulse verifier operating according to recognition of the validity of said reference signal by said energy correlativity calculator and checking number of times that have been input and time of input of said dial pule, said dial pulse verifying whether said dial pulse corresponds to said pre-test dialing digits.

2. A dial pulse detector comprising:

a delay correlativity calculator for receiving dial pulses generated by predetermined pre-test dialing digits dialed by a subscriber, and including a delay section for delaying a dial pulse to produce a delayed dial pulse, said delay correlativity calculator calculating a correlativity between the delayed dial pulse and an undelayed dial pulse to sample a reference signal of said dial pulse and obtain a sampled reference signal;

an energy correlativity calculator for calculating an energy correlativity between said sampled reference signal and a received dial pulse, said energy correlativity calculator examining validity of said reference signal; and a dial pulse verifier operating according to a recognition of the validity of said reference signal by said energy correlativity calculator, for checking input number of times and input time of said dial pulse, and for verifying whether said dial pulse corresponds to said pre-test dialing digits.

3. The dial pulse detector of claim 2, wherein the dial pulse detector further comprises:
a pre-processor filtering dial pulses generated by said predetermined pre-test dialing digits dialed by said subscriber, using a dial pulse band, and sampling only a selected dial pulse for each predetermined cycle among said filtered dial pulses.

4. The dial pulse detector as claimed in claim 3, wherein said pre-processor comprises:
a filter filtering a band of a dial pulse signal; and
a sampler sampling only each kth dial pulse among said filtered dial pulses.

5. The dial pulse detector as claimed in claim 4, wherein said filter is a low-pass filter suitable for removing noise contained in each dial pulse.

6. The dial pulse detector as claimed in claim 5, wherein said low-pass filter is a finite impulse response filter.

7. The dial pulse detector of claim 2, wherein said energy correlativity calculator comprises a plurality of multipliers for multiplying received dial pulses by sampled reference signals to obtain products, and a summer for summing the products.

8. A dial pulse detector, comprising:
a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;
an energy correlativity calculator calculating an energy correlativity between said sampled reference signal and a received dial pulse, said energy correlativity calculator examining validity of said reference signal; and
a dial pulse verifier operating according to a recognition of the validity of said reference signal by said energy correlativity calculator, checking input number of times and input time of said dial pulse, and verifying whether said dial pulse corresponds to said pre-test dialing digits;
wherein said delay correlativity calculator comprises:
a dial pulse delayer delaying applied dial pulses at a predetermined velocity;
a first calculator receiving a first predetermined number of samples r[] among said dial pulses which are not delayed and performing calculation in the following equation (1) to output a result value γ1;
a second calculator receiving a second predetermined number of samples s[] among said dial pulses delayed by a first predetermined delay period and performing calculation in the following equation (2) to output a result value γ2;
a third calculator receiving said samples r[] and s[] and performing calculation in the following equation (3) to output a result value $C_0$; and
a delay correlativity determiner receiving said result values γ1, γ2 and $C_0$ and determining the delay correlativity of said dial pulse using the following relationship (4):

$$\gamma_1 = \sum_{k=0}^{k'} r(k)^2 \tag{1}$$

$$\gamma_2 = \sum_{k=0}^{k'} s(k)^2 \tag{2}$$

$$C_0 = \left| \sum_{k=0}^{k'} r(k)s(k) \right|^2 \tag{3}$$

$$C_o \geq \alpha \gamma 1 \gamma 2. \tag{4}$$

9. A dial pulse detector as claimed in claim 8, wherein said dial pulse delayer is a first-in-first-out (FIFO) type buffer.

10. A dial pulse detector, comprising:
a delay correlativity calculator receiving dial pulses generated by predetermined pre-test dialing digits dialed by a subscriber, calculating a correlativity between a delayed dial pulse and an undelayed dial pulse to sample a reference signal of said dial pulse;
an energy correlativity calculator calculating an energy correlativity between said sampled reference signal and a received dial pulse, said energy correlativity calculator examining validity of said reference signal; and
a dial pulse verifier operating according to a recognition of the validity of said reference signal by said energy correlativity calculator, checking input number of times and input time of said dial pulse, and verifying whether said dial pulse corresponds to said pre-test dialing digits;
wherein said energy correlativity calculator comprises:
a first buffer temporarily storing a first predetermined number of samples r'[] among successively applied dial pulses;
a second buffer temporarily storing a second predetermined number of samples s[] among said sampled reference signals;
a first calculator receiving said samples r'[] and performing calculation in the following equation (5) to output a result value $\gamma_a$;
a second calculator receiving said samples s[] and performing calculation in the following equation (6) to output a result value $\gamma_b$;
a third calculator receiving said samples r[] and s[] and performing calculation in the following equation (7) to output a result value $C_1$; and
an energy correlativity determiner receiving said result values $\gamma_a$, $\gamma_b$ and $C_1$ and determining the energy correlativity using the following relationship (8):

$$\gamma_a = \sum_{k=0}^{k'} r'(k)^2 \tag{5}$$

$$\gamma_b = \sum_{k=0}^{k'} s(k)^2 \tag{6}$$

$$C_1 = \left| \sum_{k=0}^{k'} r'(k)s(k) \right|^2 \tag{7}$$

$$C_1 \geq \beta \gamma_a \gamma_b. \tag{8}$$

11. The dial pulse detector of claim 10, wherein said energy correlator generates a clear signal when condition of equation (8) is met.

12. A dial pulse detector, comprising:
a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;
an energy correlativity calculator calculating an energy correlativity between said sampled reference signal and a received dial pulse, said energy correlativity calculator examining validity of said reference signal; and a dial pulse verifier operating according to a recognition of the validity of said reference signal by said energy correlativity calculator, checking input number of times and input time of said dial pulse, and verifying whether said dial pulse corresponds to said pre-test dialing digits;

wherein the dial pulse detector further comprises a preprocessor filtering dial pulses generated by said predetermined pre-test dialing digits dialed by said subscriber, using a dial pulse band, and sampling only a selected dial pulse for each predetermined cycle among said filtered dial pulses;

wherein said delay correlativity calculator comprises:
 a dial pulse delayer delaying applied dial pulses at a predetermined velocity;
 a first calculator receiving a first predetermined number of samples r[] among said dial pulses which are not delayed, and performing calculation in the following equation (1) to output a result value γ1;
 a second calculator receiving a second predetermined number of samples s[] among said dial pulses delayed by a predetermined delay period, and performing calculation in the following equation (2) to output a result value γ2;
 a third calculator receiving said samples r[] and s[] and performing calculation in the following equation (3) to output a result value $C_0$; and
 a delay correlativity determiner receiving said result values γ1, γ2 and $C_0$ and determining the delay correlativity of said dial pulse using the following relationship (4):

$$\gamma_1 = \sum_{k=0}^{k'} r(k)^2 \quad (1)$$

$$\gamma_2 = \sum_{k=0}^{k'} s(k)^2 \quad (2)$$

$$C_0 = \left| \sum_{k=0}^{k'} r(k)s(k) \right|^2 \quad (3)$$

$$C_o \geq \alpha\gamma_1\gamma_2. \quad (4)$$

13. A dial pulse detector, comprising:
 a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;
 an energy correlativity calculator calculating an energy correlativity between said sampled reference signal and a received dial pulse, said energy correlativity calculator examining validity of said reference signal; and
 a dial pulse verifier operating according to a recognition of the validity of said reference signal by said energy correlativity calculator, checking input number of times and input time of said dial pulse, and verifying whether said dial pulse corresponds to said pre-test dialing digits;

wherein the dial pulse detector further comprises a preprocessor filtering dial pulses generated by said predetermined pre-test dialing digits dialed by said subscriber, using a dial pulse band, and sampling only a selected dial pulse for each predetermined cycle among said filtered dial pulses;

wherein said energy correlativity calculator comprises:
 a first buffer temporarily storing a first predetermined number of samples r'[] among successively applied dial pulses;
 a second buffer temporarily storing a second predetermined number of samples s[] among said sampled reference signals;
 a first calculator receiving said samples r'[] and performing calculation in the following equation (5) to output a result value $\gamma_a$;
 a second calculator receiving said samples s[], and performing calculation in the following equation (6) to output a result value $\gamma_b$;
 a third calculator receiving said samples r[] and s[] and performing calculation in the following equation (7) to output a result value $C_1$; and
 energy correlativity determiner receiving said result values $\gamma_a$, $\gamma_b$ and $C_1$ and determining the energy correlativity using the following relationship (8):

$$\gamma_a = \sum_{k=0}^{k'} r'(k)^2 \quad (5)$$

$$\gamma_b = \sum_{k=0}^{k'} s(k)^2 \quad (6)$$

$$C_1 = \left| \sum_{k=0}^{k'} r'(k)s(k) \right|^2 \quad (7)$$

$$C_1 \geq \beta\gamma_a\gamma_b. \quad (8)$$

14. The dial pulse detector of claim 13, wherein said energy correlator generates a clear signal when condition of equation (8) is met.

15. A dial pulse detector, comprising:
 a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;
 an energy correlativity calculator calculating an energy correlativity between said sampled reference signal and a received dial pulse, said energy correlativity calculator examining validity of said reference signal; and
 a dial pulse verifier operating according to a recognition of the validity of said reference signal by said energy correlativity calculator, checking input number of times and input time of said dial pulse, and verifying whether said dial pulse corresponds to said pre-test dialing digits;

wherein said delay correlativity calculator comprises:
 a dial pulse delayer delaying applied dial pulses at a predetermined velocity;
 a first calculator receiving a first predetermined number of samples r[] among said dial pulses which are not delayed and performing a first calculation to output a result value γ1;
 a second calculator receiving a second predetermined number of samples s[] among said dial pulses delayed by a first predetermined delay period and performing a second calculation to output a result value γ2;
 a third calculator receiving said samples r[] and s[] and performing a third calculation to output a result value $C_0$; and
 a delay correlativity determiner receiving said result values γ1, γ2 and $C_0$ and determining the delay correlativity of said dial pulse by performing a fourth calculation.

16. A dial pulse detector, comprising:
a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;

an energy correlativity calculator calculating an energy correlativity between said sampled reference signal and a received dial pulse, said energy correlativity calculator examining validity of said reference signal; and a dial pulse verifier operating according to a recognition of the validity of said reference signal by said energy correlativity calculator, checking input number of times and input time of said dial pulse, and verifying whether said dial pulse corresponds to said pre-test dialing digits;

wherein said energy correlativity calculator comprises:
a first buffer temporarily storing a first predetermined number of samples r'[] among successively applied dial pulses;
a second buffer temporarily storing a second predetermined number of samples s[] which are said sampled reference signals;
a first calculator receiving said samples r'[] and performing a fifth calculation to output a result value $\gamma_a$;
a second calculator receiving said samples s[], and performing a sixth calculation to output a result value $\gamma_b$;
a third calculator receiving said samples r[] and s[], and performing a seventh calculation to output a result value $C_1$; and
an energy correlativity determiner receiving said result values $\gamma_a$, $\gamma_b$ and $C_1$ and determining the energy correlativity by performing an eighth calculation.

17. A dial pulse detector, comprising:
a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;

an energy correlativity calculator calculating an energy correlativity between said sampled reference signal and a received dial pulse, said energy correlativity calculator examining validity of said reference signal; and a dial pulse verifier operating according to a recognition of the validity of said reference signal by said energy correlativity calculator, checking input number of times and input time of said dial pulse, and verifying whether said dial pulse corresponds to said pre-test dialing digits;

wherein the dial pulse detector further comprises a pre-processor filtering dial pulses generated by said predetermined pre-test dialing digits dialed by said subscriber, using a dial pulse band, and sampling only a selected dial pulse for each predetermined cycle among said filtered dial pulses;

wherein said delay correlativity calculator comprises:
a dial pulse delayer delaying applied dial pulses at a predetermined velocity;
a first calculator receiving a first predetermined number of samples r[] among said dial pulses which are not delayed and performing a first calculation to output a result value γ1;
a second calculator receiving a second predetermined number of samples s[] among said dial pulses which are delayed by a predetermined delay period and performing a second calculation to output a result value γ2;
a third calculator receiving said samples r[] and s[] and performing third calculation to output a result value $C_0$; and a delay correlativity determiner receiving said result values γ1, γ2 and $C_0$ and determining the delay correlativity of said dial pulse by performing a fourth calculation.

18. A dial pulse detector, comprising:
a delay correlativity calculator receiving dial pulses generated by predetermined pre-test dialing digits dialed by a subscriber, and calculating a correlativity between a delayed dial pulse and an undelayed dial pulse to sample a reference signal of said dial pulse;

an energy correlativity calculator calculating an energy correlativity between said sampled reference signal and a received dial pulse, said energy correlativity calculator examining validity of said reference signal; and a dial pulse verifier operating according to a recognition of the validity of said reference signal by said energy correlativity calculator, checking input number of times and input time of said dial pulse, and verifying whether said dial pulse corresponds to said pre-test dialing digits;

wherein the dial pulse detector further comprises a pre-processor filtering dial pulses generated by said predetermined pre-test dialing digits dialed by said subscriber, using a dial pulse band, and sampling only a selected dial pulse for each predetermined cycle among said filtered dial pulses;

wherein said energy correlativity calculator comprises:
a first buffer temporarily storing a first predetermined number of samples r'[] among successively applied dial pulses;
a second buffer temporarily storing a second predetermined number of samples s[] which are said sampled reference signals;
a first calculator receiving said samples r'[], and performing a fifth calculation to output a result value $\gamma_a$;
a second calculator receiving said samples s[], and performing a sixth calculation to output a result value $\gamma_b$;
a third calculator receiving said samples r[] and s[] and performing a seventh calculation to output a result value $C_1$; and
an energy correlativity determiner receiving said result values $\gamma_a$, $\gamma_b$ and $C_1$ and determining the energy correlativity by performing an eighth calculation.

19. A dial pulse detecting method, comprising the steps of:
calculating a delay correlativity between a dial pulse generated by predetermined pre-test dialing digits dialed by a subscriber and a dial pulse delayed by a predetermined period;
sampling a reference signal of said dial pulse to obtain a sampled reference signal;
calculating an energy correlativity between said sampled reference signal and a received dial pulse by performing a cross-correlation therebetween so as to examine validity of said reference signal; and
when the validity of said reference signal is recognized in said energy correlativity calculating step, checking an input number of times and an input time of said dial pulse and then verifying whether said dial pulse corresponds to said pre-test dialing digits.

20. The dial pulse detecting method of claim 19, further comprising the step of:
pre-processing step of filtering dial pulses generated by predetermined said pre-test dialing digits dialed by said subscriber with a dial pulse band and sampling only a selected dial pulse for each predetermined cycle among said filtered dial pulses.

21. The dial pulse detecting method as claimed in claim 20, wherein said pre-processing step utilizes a pre-processor comprising:
   a filter filtering a band of a dial pulse signal; and
   a sampler sampling only each kth dial pulse among said filtered dial pulses.

22. The dial pulse detector as claimed in claim 21, wherein said filter is a low-pass filter suitable for removing noise contained in the dial pulses.

23. The dial pulse detector as claimed in claim 22, wherein said low-pass filter is a finite impulse response (FIR) filter.

24. The dial pulse detecting method of claim 19, wherein said energy correlativity calculating step comprises:
   temporarily storing a third predetermined number of samples r'[] among successively applied dial pulses;
   temporarily storing a fourth predetermined number of samples s[] which are said sampled reference signals;
   receiving said samples r'[] and performing calculation in the following equation (5) to output a result value $\gamma_a$;
   receiving said samples s[] and performing calculation in the following equation (6) to output a result value $\gamma_b$;
   receiving said samples r[] and s[] and performing calculation in the following equation (7) to output a result value $C_1$; and
   receiving said result values $\gamma_a$, $\gamma_b$ and $C_1$ and determining the energy correlativity using the following relationship (8):

$$\gamma_a = \sum_{k=0}^{k'} r'(k)^2 \tag{5}$$

$$\gamma_b = \sum_{k=0}^{k'} s(k)^2 \tag{6}$$

$$C_1 = \left| \sum_{k=0}^{k'} r'(k)s(k) \right|^2 \tag{7}$$

$$C_1 \geq \beta \gamma_a \gamma_b. \tag{8}$$

25. The dial pulse detecting method of claim 19, wherein said delay correlativity calculating step includes providing a delay section for delaying a dial pulse to produce a delayed dial pulse, and employing said delay section in calculating said delay correlativity.

26. The dial pulse detecting method of claim 19, wherein said energy correlativity calculating step includes proving a plurality of multipliers for multiplying received dial pulses by sampled reference signals to obtain products, and a summer for summing the products.

27. A dial pulse detecting method comprising:
   a delay correlativity calculating step of calculating a correlativity between a dial pulse generated by predetermined pre-test dialing digits dialed by a subscriber and a dial pulse delayed by a predetermined period, and of sampling a reference signal of said dial pulse;
   an energy correlativity calculating step of calculating an energy correlativity between said sampled reference signal and a received dial pulse to examine validity of said reference signal; and
   a dial pulse verifying step of being operated according to a recognition of the validity of said reference signal in said energy correlativity calculating step and checking input number of times and input time of said dial pulse and verifying whether said dial pulse corresponds to said pre-test dialing digits;
   said method further comprising a pre-processing step of filtering dial pulses generated by predetermined said pre-test dialing digits dialed by said subscriber with a dial pulse band and sampling only a selected dial pulse for each predetermined cycle among said filtered dial pulses;
   said delay correlativity calculating step comprising:
   delaying applied dial pulses at a predetermined velocity;
   receiving a first predetermined number of samples r[] among said dial pulses which are not delayed and performing calculation in the following equation (1) to output a result value $\gamma 1$;
   receiving a second predetermined number of samples s[] among said dial pulses delayed by a predetermined delay period and performing calculation in the following equation (2) to output a result value $\gamma 2$;
   receiving said samples r[] and s[] and performing calculation in the following equation (3) to output a result value $C_0$; and
   receiving said result values $\gamma 1$, $\gamma 2$ and $C_0$ and determining the delay correlativity of said dial pulse using the following relationship (4):

$$\gamma_1 = \sum_{k=0}^{k'} r(k)^2 \tag{1}$$

$$\gamma_2 = \sum_{k=0}^{k'} s(k)^2 \tag{2}$$

$$C_0 = \left| \sum_{k=0}^{k'} r(k)s(k) \right|^2 \tag{3}$$

$$C_o \geq \alpha \gamma 1 \gamma 2. \tag{4}$$

28. The dial pulse detecting method of claim 27, wherein:
   during said step of delaying applied dial pulses, a first-in-first-out (FIFO) type buffer is utilized.

29. A dial pulse detector, comprising:
   delay correlativity calculating means for receiving dial pulses generated by predetermined pre-test dialing digits dialed by a subscriber, and for calculating a correlativity between a delayed dial pulse and an undelayed dial pulse to sample a reference signal of said dial pulse and obtain a sampled reference signal;
   energy correlativity calculating means for calculating an energy correlativity between said sampled reference signal and a received dial pulse to examine validity of said reference signal, said energy correlativity calculating means including a plurality of multipliers for multiplying received dial pulses by sampled reference signals to obtain products and a summer for summing the products; and
   dial pulse verifying means operating in response to a recognition of the validity of said reference signal by said energy correlativity calculating means for checking a number of times that have been input and a time of said dial pulse that have been input, and for verifying whether said dial pulse corresponds to said pre-test dialing digits.

30. The dial pulse detector of claim 29, wherein said delay correlativity calculating means includes a delay section for delaying a dial pulse to obtain the delayed dial pulse.

* * * * *